Patented Mar. 17, 1931

1,796,427

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

PROCESS AND APPARATUS FOR TESTING INSULATORS

Application filed August 3, 1922. Serial No. 579,350.

This invention relates to tests for the dielectric strength of insulators and insulator parts and has for its object the provision of means and method of testing by which a dielectric member may be subjected to a voltage greater than that which would produce flash-over under normal conditions.

The invention is exemplified in the combination and arrangement of parts shown in the accompanying drawing and described in the following specification, and it is more particularly pointed out in the appended claims.

Figure 1:
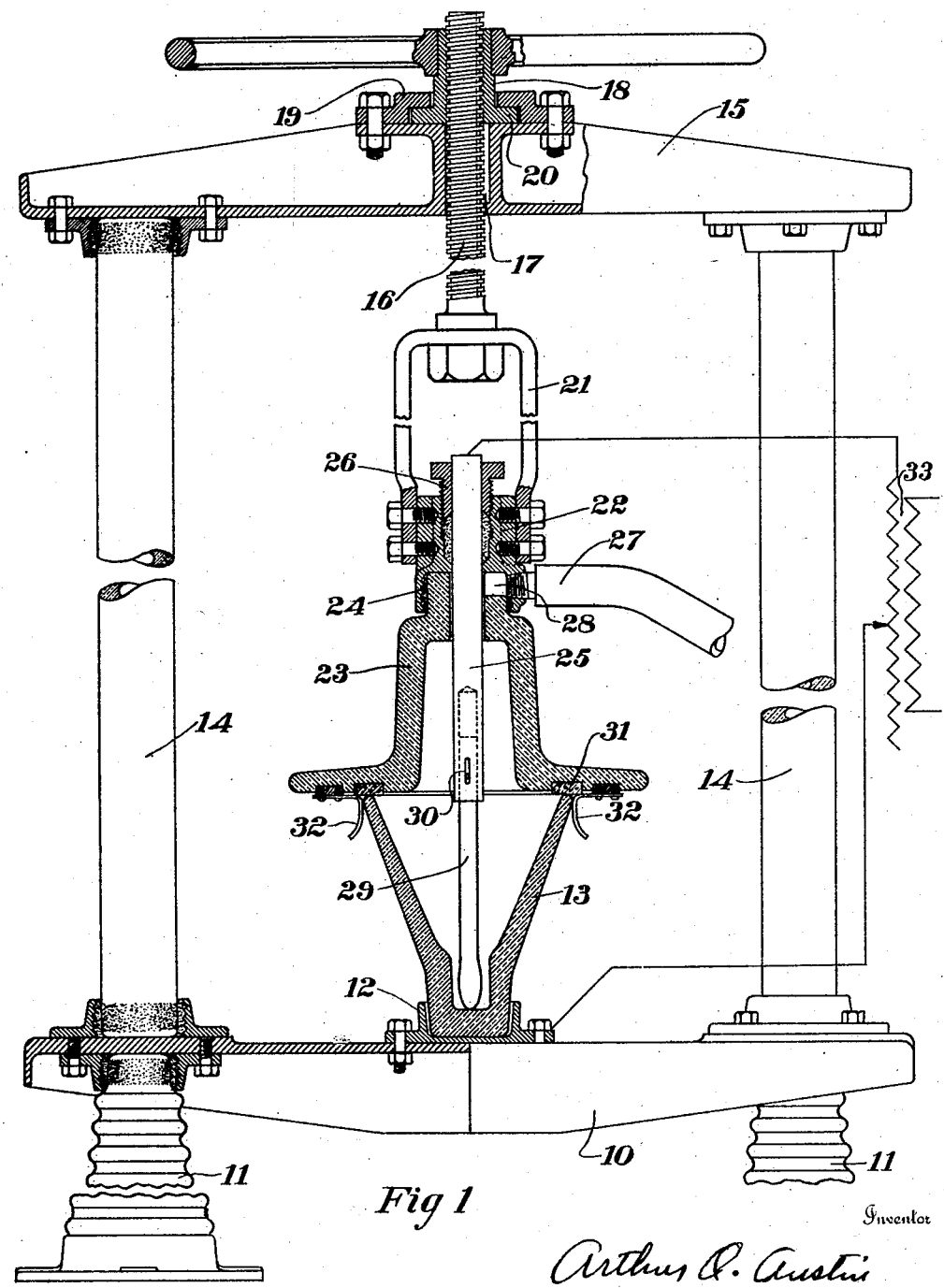
Fig. 1 is an elevation with parts in section showing one form of apparatus comprised in the present invention.

The apparatus shown in Fig. 1 includes a platform or yoke 10 mounted on pedestal insulators 11 and provided with a seat 12 for receiving an insulator part 13 to be tested. Posts 14 of dielectric material are mounted on the base 10 and carry an upper yoke 15 having a threaded bar or rod 16 slidably mounted therein and held from rotation by a key 17. A rotary sleeve or nut 18 is threaded on the rod 16 and is held in place by a cover plate 19 which engages a flange 20 on the sleeve. A hand wheel is secured to the sleeve 18 by means of which the sleeve may be rotated to raise and lower the rod 16. A yoke 21 is carried on the lower end of the rod 16 and supports a fitting 22 in which a bell 23 of dielectric material is secured by cement 24 or other suitable fastening means. A rod 25 extends thru the fitting 22 and the top of the bell 23 and is provided with a packing gland 26 for providing an air tight connection between the rod and fitting. Conduit 27 communicates with the interior of the bell 23 thru an opening 28. The lower end of the rod 25 carries an electrode 29 having a pin and slot connection 30 with the rod 25. A ring 31 of dielectric material such as rubber is secured to the lower face of the bell 23 for engaging the rim of the test piece 13 and clips 32 are also carried on the lower face of the bell for guiding the test piece into proper registration with the ring 31. The seat 12 and the rod 25 are connected respectively with the terminals of a transformer 33 by means of which potential is supplied to the electrode 29 for testing the dielectric strength of the insulator piece 13.

When a piece is tested under normal atmospheric conditions, flash-over between the electrodes will usually occur before the potential desired for testing the dielectric strength of the insulator is reached. By subjecting the surface of an insulator part to air or gas pressure greater than that of the atmosphere, the charging currents along the surface of the part may be kept down and the flash-over potential materially raised.

In the operation of the present invention the parts are placed in the position shown in the drawing and the bell 23 is tightened against the rim of the part 13 so as to form an air tight joint between the bell and the test part. Air or gas under pressure is then admitted thru the conduit 27 until the pressure is raised within the closure to an amount sufficient to reduce the flash-over so as to permit the desired voltage to be placed on the insulator part. The arrangement not only permits of a higher pressure on one face of the insulator part, but also provides what is in effect a continuation of the part 13 increasing the length of the leakage and flash-over path. This permits the voltage to which the insulator is subjected to be raised to the desired potential greater than that at which flash-over would occur under normal atmospheric conditions. The apparatus may be used for routine tests in which the part is subjected to a predetermined potential or it may be used for determining the ultimate dielectric strength for resisting puncture.

Figure 2:
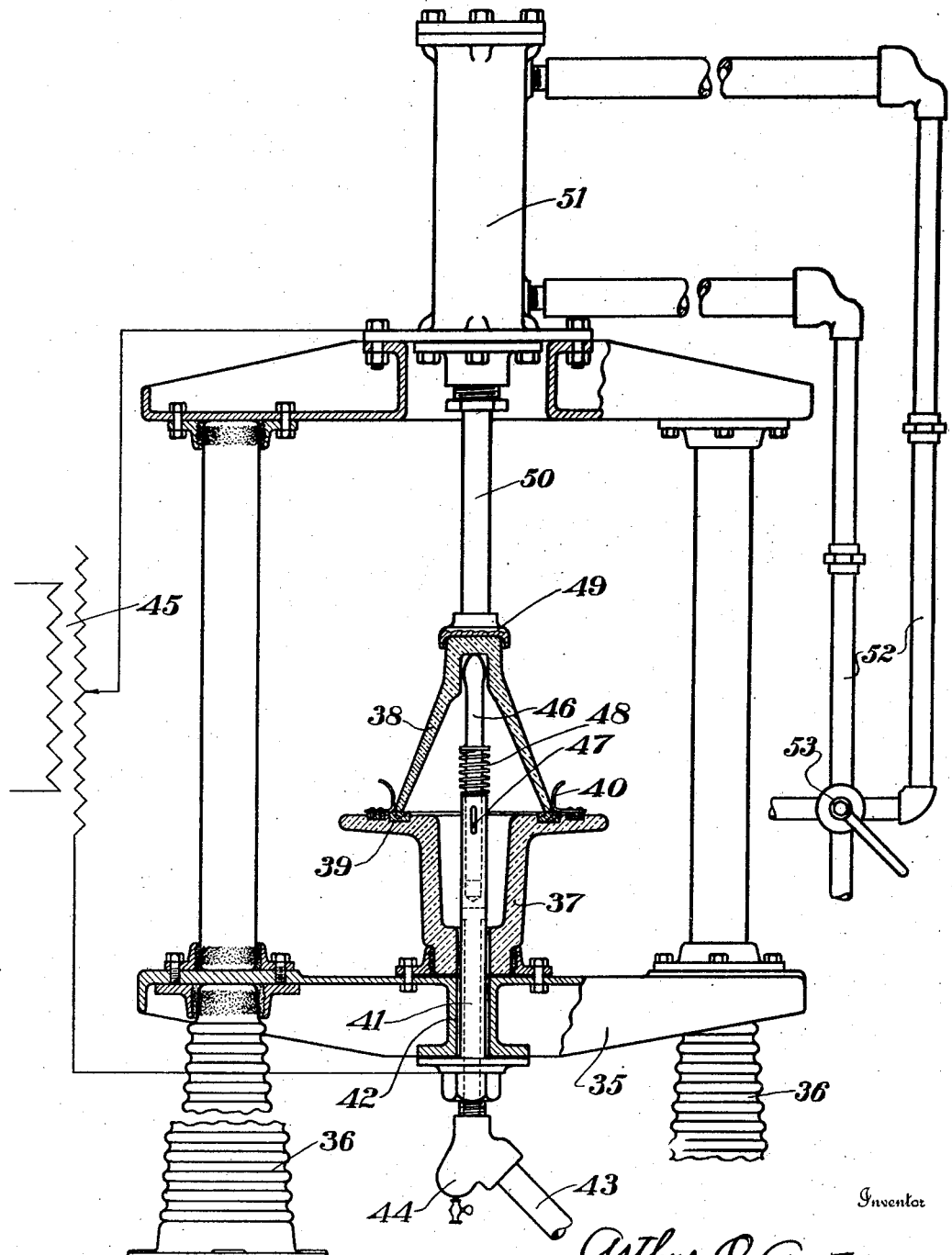
Fig. 2 is a similar view showing a modified form of mechanism.

In the form of apparatus shown in Fig. 2, a supporting yoke 35 is mounted on pedestals 36 and carries a bell 37 of dielectric material upon which the test piece 38 is placed with the rim of the flange resting on a gasket 39 on the bell 37. Clips 40 may be employed for positioning the piece on the bell, but where the parts are in the position shown in this figure the clips may be dispensed with since the operator can readily see the relative position of the bell and test part. Air or gas pressure is supplied thru a pipe 41 to the interior of the bell 37, the lower end of the pipe having a tight joint with the lower end of an opening 42 which extends thru the yoke 35. A conduit 43 is connected with the pipe 42 and is provided with a trap 44 for catching moisture which may condense within the test chamber formed by the ball 37 and the test part 38. The pipe 41 is connected to one terminal of a transformer 45 by means of which the voltage is supplied for testing the insulator part. An electrode 46 is connected with the upper end of the pipe 41 by pin and slot connections 47 and is resiliently pressed into the piece 38 by means of a spring 48. A presser cap 49 engages the top portion of the part 38 and is pressed downwardly by a rod 50 connected with a fluid pressure cylinder 51. By this means, proper pressure is brought to bear to hold the parts together against the pressure within the chamber. The rod 50 is controlled by pipes 52 connected with opposite ends of the cylinder 51 and by a valve 53.

By using a suitable gasket such as a good live rubber which may be covered with soft wax or oil to exclude air if the surface is rough a test voltage may be applied considerably higher than normal flash-over.

The pressure between the gasket and the test piece makes an electrical joint so the shell 23 is made an extension of 13. In many cases the joint made by the gasket 31 will have sufficient dielectric strength so that a proving test above normal flash-over can be applied. In this case the tube 27 for supplying air pressure is not used and may be left off.

The tests may be quickly and easily made and practically the whole surface is subjected to electrical stress. It is evident that the gasket and shell 23 may be of such form so as to make contact at some other zone on the test piece if desired.

I claim:

1. Apparatus for testing an insulator part having a flange thereon, comprising a closure member of dielectric material for engaging the rim of said flange to form a closed chamber with said part, a gasket interposed between said member and rim, means for raising the pressure within said chamber above atmospheric, an electrode for subjecting the interior surface of said part to a test potential and a cooperating electrode connected with the exterior of said part and insulated from the interior of said chamber.

2. Apparatus for testing an insulator part, comprising a support for said part, a dielectric cover member for engaging said part to form therewith a closed chamber, an electrode carried by said cover member in position to engage the interior of said part, a yielding gasket interposed between said cover member and part, means for exerting pressure on said cover member to press said gasket against said part, a conduit communicating with the interior of said chamber thru said cover member and means for subjecting said support and electrode to a difference of potential for testing said part.

3. The method of testing insulators, wherein an insulator part having an opening therein is closed to form an air tight chamber within said opening, the pressure within said chamber raised to an amount greater than atmospheric by introducing gas under pressure into said chamber and a difference in potential applied to the interior and exterior of said part at points separated from each other by an imperforate portion of said test part.

4. The method of testing the dielectric strength of a hollow insulator part, comprising the steps of closing said part to form a tight chamber therein, raising the pressure within said chamber by introducing gas under pressure into said chamber and subjecting the interior and exterior surfaces of said part to a difference of potential greater than that which would cause flashover under normal atmospheric conditions.

5. The method of testing an insulator part having a flange thereon wherein a cover of dielectric material is pressed against said flange to form a closed chamber, the pressure within said chamber raised to an amount greater than atmospheric pressure and the interior and exterior of said chamber subjected to a difference of potential greater than that which would cause flash-over at normal atmospheric pressure.

6. Means for testing a cup-shaped insulator part comprising means for closing said part to form a closed chamber including the interior of said part, means for supplying fluid pressure to the interior of said chamber, and means for subjecting said part to a test voltage, said last-named means comprising terminals disposed one within and the other entirely without said chamber, the member without said chamber being insulated from the interior of said chamber.

7. Testing apparatus for insulator parts having openings therein, said testing apparatus comprising means for closing the opening of a part to be tested to form a closed chamber, means for raising the pressure within said chamber, and means for subjecting the part to a test potential while subject to internal pressure, said last-named means comprising a terminal member disposed entirely outside of said chamber and separated by said test part from the interior of said chamber.

8. Apparatus for testing hollow insulator parts comprising means for closing a part to be tested, means for subjecting the closed part to internal pressure greater than atmospheric pressure while the exterior surface of said part is exposed to atmosphere, and means for supplying a test potential to said part while said part is subjected to internal pressure, said last-named means comprising terminal members, one of which extends into the interior of said part while the other is separated by said part from the interior thereof.

9. Means for testing an insulator part comprising a device formed of dielectric material for engaging said part and forming therewith a closed chamber, means for supplying gas pressure to the interior of said chamber, and electrodes, one of which is insulated from the interior of said chamber for supplying different potentials to the interior and exterior surfaces of said part while said part is in co-operative relation with said device.

In testimony whereof I have signed my name to this specification on this 29th day of July, A. D. 1922.

ARTHUR O. AUSTIN.